T. J. Sullivan,
Safe.
No. 3887. Reissued Mar. 22. 1870.
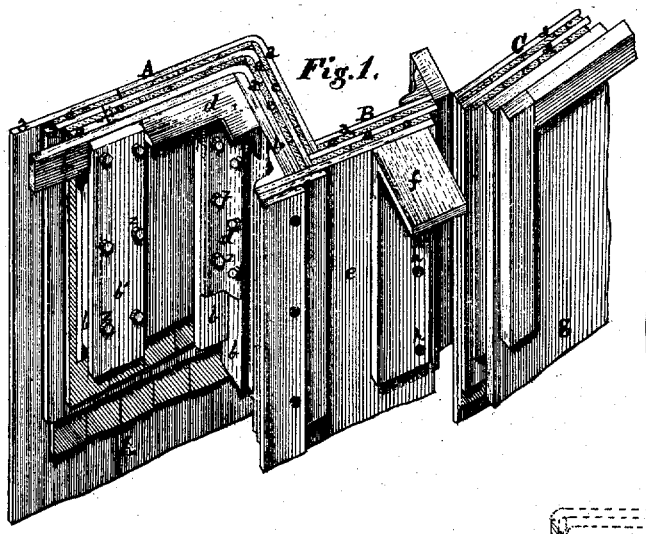
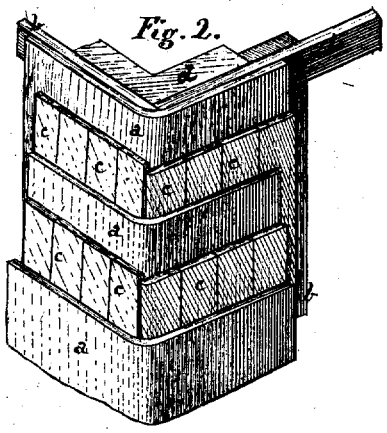
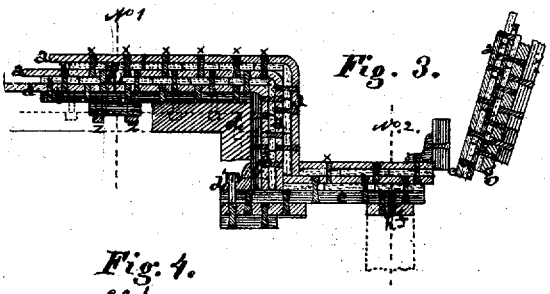
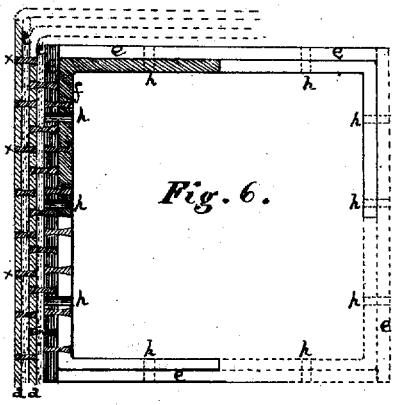
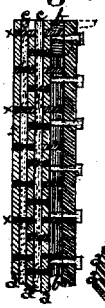
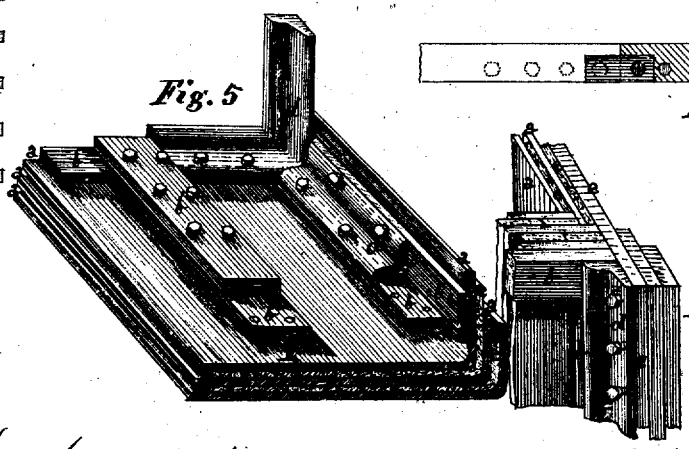
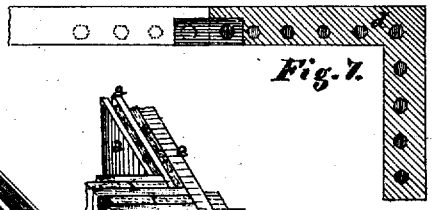
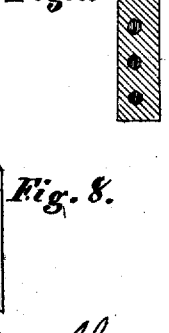
Witnesses { Alex. Selkirk
Chas. Selkirk.
T. J. Sullivan
Inventor.
N. PETERS, PHOTO-LITHOGRAPHER, WASHINGTON, D. C.

United States Patent Office.

TIMOTHY J. SULLIVAN, OF ALBANY, NEW YORK.

*Letters Patent No.* 97,829, *dated December* 14, 1869; *reissue No.* 3,887, *dated March* 22, 1870.

IMPROVEMENT IN SAFES.

The Schedule referred to in these Letters Patent and making part of the same

*To all whom it may concern:*

Be it known that I, TIMOTHY J. SULLIVAN, of the city and county of Albany, State of New York, have invented certain new and useful Improvements in the Mode of Constructing Safes and Vaults; and I do hereby declare that the following is a description thereof, reference being had to the accompanying drawings forming a part of this specification, in which Figure 1 represents a perspective view of a section of a vault or safe with a section of a vestibule and door, embodying the several parts of my invention.

Figure 2 is a perspective view from the outside of a corner of a safe representing parts broken away, and exposing some of the features of this invention.

Figure 3 is a cross-section of a section of the safe or vault, with vestibule and door, showing the arrangement of the several parts, and materials used, and the manner of uniting the same.

Figure 4 is a cross-section through fig. 3 at line No. 1.

Figure 5 is a perspective view of a section of a corner safe or vault, viewed from the inside, illustrating the manner of securing the several junctures of the body of a safe or vault.

Figure 6 represents a cross-section through fig. 3 at line No. 2, illustrating some of the improvements in the invention.

Figure 7 represents a top view of the angle-iron used at the corners, and the mode of their connections with one another, and the other parts of the safe or vault.

Figure 8 represents a perspective view of a section of a jointure of the vestibule with the body of the vault, illustrating the manner of arranging and securing the several materials and parts.

The body A of the safe or vault is constructed of alternate layers of plate-iron, *a a a*, and steel, *c c*, inter-riveted together in the usual manner by the rivets *x x*.

The plates of iron *a a a*, which form the corners of the safe or vault, are bent or made continuous round the said corners, as shown in figs. 1, 2, 3, and 5, so that the said corners will present no seam or jointures into which a wedge can be inserted to force the same, and will render the said corners (which are the weakest, as they are now constructed by butting the plates,) as strong and solid as any other part of the body of the vault or safe.

I also place around the corners of the vault or safe, and over the junctures, as in jointures 1, figs. 1, 3, and 5, the bars *b b*, which bars are inter-riveted to the body of the safe, as shown in figs. 3, 4, and 5.

By means of the said bars great labor and expense is saved, for as safes and vaults are now constructed, the several plates of steel and iron used to form the body are first riveted together, then drilled and tapped from the inner side of the body through at least the two inner plates of iron *a a*, and their intervening plates of steel *c*, when the several plates of iron *a* and steel *c* are taken apart by cutting away the rivets to enable the workmen to harden the steel plates *c* before they are permanently secured in their places with the iron plates to form the body of the safe.

The said bars *b b* are of heavy bar-iron, say about one-half inch or more in thickness, and three inches or more in width; and, after the said bars *b b* have been placed around the corners and over the jointures, as described, the said bars *b b* (if not previously drilled and tapped with screw-thread to receive the necessary bolts for securing other parts of the safe) can be easily drilled and tapped, and also the next immediate iron plate *a* down to the first steel plate *c*, and present a sufficient depth of screw-threaded hole to receive and hold secure the bolts to be secured therein.

By thus employing the said bars *b*, the steel plates *c* can be drilled and hardened and inter-riveted with the plates of iron *a* permanently the first time, thus dispensing with the labor and cost of one riveting and cutting out of the same, as is now required in the old method of construction.

The said bars *b b* being properly secured in their places, drilled and tapped, are ready to have secured to them by the bolts *z z* the usual strengthening-bars *b'* and angle-irons *d*.

The vestibule B, made with the body of the vault, is, as vaults are now constructed, the weakest part, especially in its jointure with the body of the vault, for the strength of the said jointures as now made depends most entirely on frail bands or straps, which connect the said vestibule with the body A.

In my invention, I use, in addition to the usual plates *a a* and steel *c c*, figs. 1, 3, 6, and 8, the heavy iron plate *e*, which plate is of boiler-iron, about one-half inch in thickness, and is inter-riveted with the usual shell comprising the plates *a* and *c*.

The said plate *e* is extended back of the termination of the usual shell, and part of the same into the body of the vault, to a distance equal to the width of the angle-iron *d'*, as shown in figs. 1, 3, and 8, which angle-iron is used instead of straps or bands.

The angle-iron *d'*, I secure first to the body of the vault, as shown by bolts *z*, passing through one angle of the said angle-iron, and screwing into a bar, *b*, (before described.) The heavy plate *e* is then secured to the other angle of the said angle-iron *d'* by bolts *z*, as shown in fig. 8.

A vestibule thus connected with the body of a vault, will defy almost any mechanical force which safe-breakers could bring to bear against the same to effect a sundering of the said vestibule from the vault at its junctures.

The said heavy plate *e*, like the bars *b*, dispenses with the necessity of one labor of riveting the plates *a* and *c*, and cutting out the same, as its (the plate *e*) thickness of metal affords an ample depth for the necessary screw-threaded holes that must needs be cut therein to receive the necessary bolts (not shown) for securing the usual angle-irons which connect the top and bottom of the vestibule and to the sides of the same.

To further strengthen the vestibule of the vault, I form of heavy bars of iron solid corner-irons *f*, figs. 1 and 6, which solid corner-irons I denominate rabbet-bars. These rabbet-bars I place around the entrance, inside the vestibule, and bring the ends of their angles to butt one against the other, in the manner as shown in fig. 6, (by shaded, full, and dotted lines,) when the said rabbet-bars are riveted or bolted to the heavy plates *e*.

To make the door C as strong as the other portions of the safe and vault, and to dispense with the necessity of one labor of riveting together the parts comprising the shell, and cutting out of rivets to separate the same prior to the hardening of the steel plates *c c*, and also to prevent weakening the door by tapping to receive the usual studs of the lock-frame, I inter-rivet to the said usual plates *a* and *c* a heavy plate, *g*, of boiler-iron, shown in figs. 1 and 3, which plate will present a sufficient depth of material for the firm hold of the bolt-ends of the usual studs of the lock-frame, and dispense with the necessity of piercing the usual plates *a* and *c* for the reception of the said studs, which piercing of the said plates materially weakens the door.

To secure the door C firmly to its place when closed, I sink through the rabbet-bars *f*, and into the heavy plate *e* of the vestibule, the lock-bolt holes *h h*, figs. 1, 3, and 6, which lock-bolt holes receive the lock-bolts into the said rabbet-bars and heavy plate from all directions, as shown in full and dotted lines in fig. 6. Being thus secured, the door cannot be started from its place by any force without tearing away the said plate *e* and rabbet-bars *f* from their places.

The sinking of the said lock-bolt holes *h* dispenses with the usual frail lashings or bands now employed to receive the lock-bolts.

Having described my invention,

What I claim, and desire to secure by Letters Patent, is—

1. In safes and vaults, forming the corners of the same with two or more bent iron plates *a a*, with the intervening plates of steel *c*, substantially as and for the purpose set forth.

2. In safes or vaults, the bars *b*, when placed around the corners or over the joints of the several plates which comprise the body A, substantially as and for the purpose set forth.

3. The heavy plate *e*, in combination with the plates *a* and *c* forming the vestibule, substantially as and for the purpose set forth.

4. In vaults or safes, strengthening the junctures of the vestibule with the body of the same by securing the plate *e* to the angle iron *d*, substantially as and for the purpose set forth.

5. In the vestibule of a safe or vault, securing the several sides of the same together, and strengthening their junctures by means of the solid corner rabbet-bars *f*, substantially in the manner set forth.

6. In doors of safes and vaults, the combination of the heavy plate *g* with the usual plate forming the said door, substantially as and for the purpose set forth.

7. The lock-bolt holes *h*, when made into the rabbet-bars *f*, and continued through the plate *e* in a line of direction at right angles with the said plate *e*, substantially in the manner shown and described, for the purpose set forth.

T. J. SULLIVAN.

Witnesses:
ALEX. SELKIRK,
CHAS. SELKIRK.